United States Patent [19]

Rezmer

[11] Patent Number: 5,052,514
[45] Date of Patent: Oct. 1, 1991

[54] SAFETY HARNESS FOR HUNTERS

[75] Inventor: Leonard D. Rezmer, Montrose, Mich.

[73] Assignee: The Game Tracker, Inc., Flushing, Mich.

[21] Appl. No.: 502,549

[22] Filed: Mar. 30, 1990

[51] Int. Cl.⁵ .............................................. A62B 35/00
[52] U.S. Cl. .................................................... 182/9
[58] Field of Search ................................. 182/9, 3, 5–7

[56] References Cited

U.S. PATENT DOCUMENTS

| | | | |
|---|---|---|---|
| 2,459,545 | 1/1949 | Schultz | 182/9 |
| 4,923,048 | 5/1990 | Cole | 182/9 |
| 4,951,778 | 8/1990 | Halvorson | 182/9 |

Primary Examiner—Reinaldo P. Machado
Attorney, Agent, or Firm—Weintraub, DuRoss & Brady

[57] ABSTRACT

A safety harness especially for hunters who use tree stands is disclosed. The harness comprises a web belt with a buckle for the hunter. Attached to the belt by a "D"-ring is a safety rope which is fastened around the tree and back onto the "D"-ring by a cammed-hook assembly to secure the hunter from falling. The harness is easily portable and is usable both as a climbing harness and as a tether while the hunter is on the tree stand.

8 Claims, 1 Drawing Sheet

SAFETY HARNESS FOR HUNTERS

BACKGROUND OF THE INVENTION

1. Field of the Invention

The present invention relates to safety harnesses. More particularly, the present invention relates to a safety harness for use by hunters in the field who utilize tree stands in hunting.

2. Description of the Related Art

When hunting game, such as deer and the like, it is desirable for the hunter to go unperceived by his quarry. Towards that end, a hunter of such ground dwelling game, will often place himself above the normal field of perception of such game by locating a platform, or hunting stand in a tree whereon the hunter may rest unperceived and shoot game therefrom. Such a "tree stand" is often a portable structure or platform which is carried by the hunter into the woods, set in place on the tree during the hunt and then removed thereafter. The climbing of a tree by the hunter, the placing of his stand, and his subsequent watch on the stand, all take place at heights which represent the potential for injury should the hunter fall. It will be remembered that such activities usually take place in the isolation of the woods far from available medical help, and often, even far from first aid providers.

In the past, hunters using tree stands have taken the attendant height risks without benefit of safety harnesses.

Known safety harnesses, such as those worn by utility company linemen for pole climbing, are bulky, expensive, have limited channels of distribution, and are not designed for free movement once the wearer reaches a stand since, of course, such stands are utilized by linemen when on the pole. Thus, should an ordinary hunter be able to find a known belt, afford it, and be willing to pack the extra weight into the field, the known belts are still not particularly designed to provide a comfortable safety line with an adequate range of movement once the hunter rests upon his stand.

Thus, there exists a need for a light weight, easily utilized, low cost, safety harness which will secure a hunter during the climbing of a tree and while on the tree stand.

SUMMARY OF THE INVENTION

The present invention is designed to provide a light weight, easily utilized, low cost, safety harness for a hunter for use climbing trees or while in a tree stand, Towards this end the present invention provides a safety harness for hunters which generally comprises:

(a) a strap for of encircling the torso of a wearer;

(b) a buckle for releasably closing the strap into an annular belt;

(c) a ring capable of encircling the belt;

(d) a cord, the cord being affixable at a first end thereof to the ring, and (e) a hook assembly, the hook assembly having:

(1) a channel therethrough for receiving a second end of the cord, (2) means for selectively impeding the travel of the cord through the channel in a first direction, (3) a hook having:

(i) a mouth for receiving the cord, and (ii) a body capable of substantially surrounding the cord and capable of substantially surrounding the ring, and (4) armature for of selectively closing the mouth of the hook.

Other attendant advantages will be more readily appreciated as the same becomes better understood by reference to the following detailed description and considered in connection with the accompanying drawings in which like reference numerals designate like parts throughout the figures.

DESCRIPTION OF THE PREFERRED EMBODIMENTS

Figure 1:
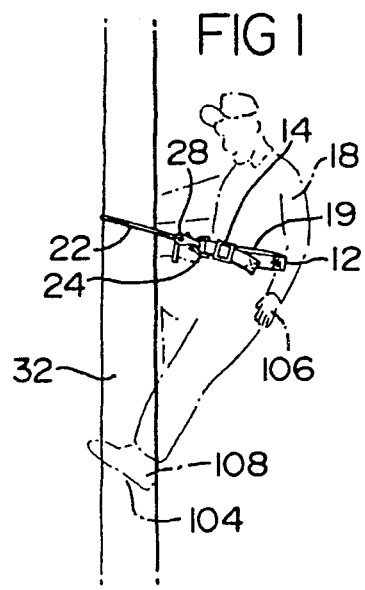
FIG. 1 is an environmental view of the safety harness as attached to a wearer climbing a tree.

As seen in FIG. 1, a safety harness 10, for a hunter 18, or wearer, climbing a tree 32, generally comprises a strap 12, affixed by a buckle 14 into an annular belt 19 about the waist 16, or torso 17, of a wearer 18. The harness 10 further comprises a safety line assemblage 21 attached to the strap 12, generally including a cord 22 with a ring 24 attached at a first end 26 of the cord, and a hook assembly 28 attached at a second end 30 thereof. These elements help secure the wearer 18 by the strap 12 to a tree 32, as further explained below.

The strap 12 of the preferred embodiment is an elongated piece of material or webbing 34 which, in operation, is secured about the wearer 18 into an annular belt 19 by the buckle 14. Preferably, the strap 12 is of a size to encircle a wide range of wearer waists 16 or torsos 17. The strap 12 is preferably made of a strong, lightweight, abrasion resistant and stretch-resistant material and/or weave design so as to be:

conveniently portable over harsh terrain; durable; and stable under operating conditions, as explained below. Man-made fibers such as nylon, polypropylene, or polyethylene, will offer the advantages of being lighter than a comparable size and strength leather belt, showing little or no stretch whether wet or dry, and have the additional advantage of being heat sealable for the repair of snags, runs, trimming to size the strap 12 etc. It is also preferable for physical reasons to provide a strap 12 whose width is sufficient to distribute the loading forces of harness 10 operation over a broad enough area on the wearer 18 so as to not cause discomfort to the wearer 18.

It will be appreciated that a variety of fabrics or materials, man-made or natural, woven or non-woven; may be used in accordance with the present invention to supply a strap 12 of a variety of dimensions. As an alternative to the single broad strap illustrated in the drawings, it is envisioned that a narrow strap having a load bearing pad (not shown) located thereon could also be used.

Figure 5:
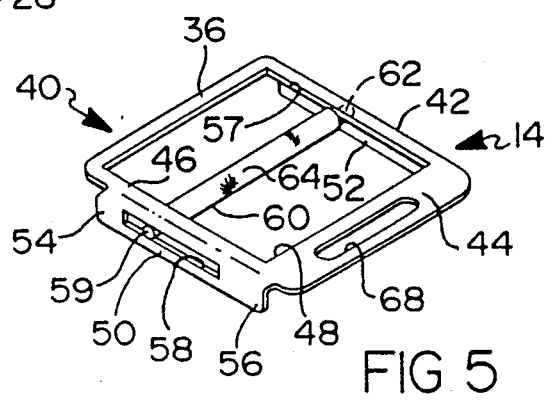
FIG. 5 is a perspective view of the buckle.

As seen in FIG. 5, the buckle 14 is made from aluminum alloy or other suitably surface-hard and strong materials adequately to the task of securing the strap 12 about the wearer 18 during climbing operations. The buckle 14 generally comprises a rectangular frame 40 having first, second, third, and fourth coplanar frame legs 36, 42, 44, 46, respectively, which define a central opening 48 within the boundaries of the frame 40. A first "U"-shaped side flange 50 extends perpendicularly from the fourth frame leg 46. The side flange 50, is attached to the fourth frame leg 46 by the arms 54, 56 of the "U" so as to define a race 58 within the buckle 14 for slidably retaining a first end 59 of a tensioning bar 60. A second "U"-shaped side flange 52, substantially identical to the first flange 50, is attached to the second frame leg 42 in a like manner to define a second race 57 for retaining a second end 62 of the tensioning bar 30.

The tensioning bar 60 is an annular rod 66 having a knurled surface 64 thereon to aid in grasping the strap 12, as further explained below. The first and second tension bar ends 59, 62, respectively, are flattened so as to more easily slide within the races 57, 58 of the buckle 14.

An aperture 68 is formed in the third frame leg 44 of the buckle 14. A ribbon 70, as seen in FIG. 2, is fastened through the aperture 68 to provide an easily utilized single-hand means for releasing the strap 12 from the grasp of the buckle 14, as further explained below.

Figure 2:
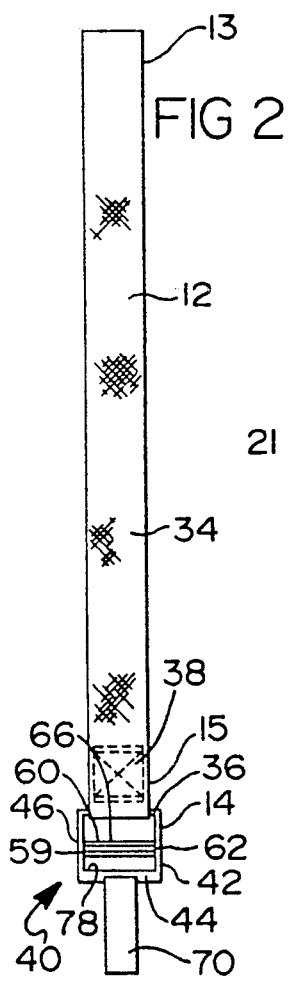
FIG. 2 is a top plan view of a strap and buckle operable assemblage according to the present invention.

As seen in FIGS. 2 and 5, a buckle 14, is secured to the strap 12 by passing the strap 12 over a first buckle frame leg 36, folding the strap 12 back onto itself to form a loop (not shown) around the first frame leg 36, and securing the strap 12 in this position by stitching 38, adhesive, or other known fastening means.

Figure 3:
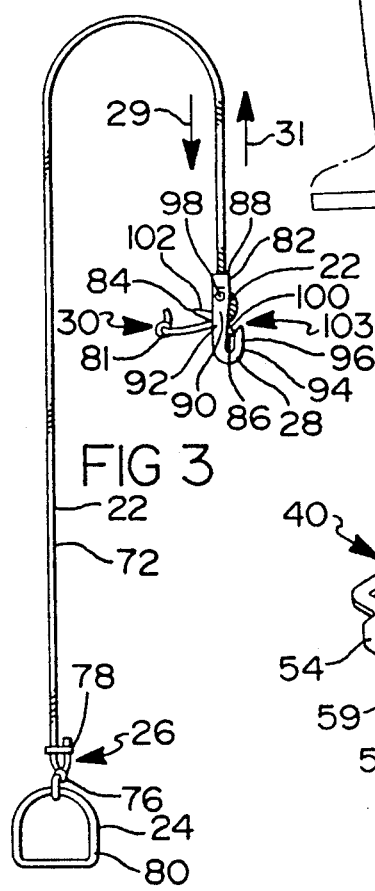
FIG. 3 is a top plan view of a cord, ring, and hook operable assemblage according to the present invention.

As seen in FIG. 3 a hook 28, ring 24 and cord 22 are combined in a safety line assemblage 21 so as to be connected to the strap 12 through the ring 24.

The cord 22 functions as a safety line attaching the wearer 18 to a tree 32 (see FIGS. 1 and 4) to prevent a plummet therefrom by the wearer 18. The cord 22 is preferably made of a strong, lightweight, abrasion resistant, and nonstretching material such as multifilament polypropylene and/or weave design, such as diamond-braiding, so as to provide advantages of portability, durability and good operating characteristics, as cited above for the strap 12. The cord 22 in the preferred embodiment is a rope 72 of man-made material, such as nylon, having a length sufficient to encircle a tree 32 having a circumference adequate to support a tree stand 74 and the wearer 18. The first end 26 of the cord is fastened about the ring 24 by a knot 76 formed thereabout by the cord 22. As an added safety feature, in the preferred embodiment, the cord first end 26 is fastened back upon the cord 22 by a crimped metal band 78 to ensure the knot 76 stays fastened about the ring 24.

The ring 24 is a closed loop 80 which in the preferred embodiment is "D"-shaped. Such rings are commonly referred to as "D"-rings. The ring 24 is formed of a strong, hard, material such as steel or the like and has a smooth surface to prevent wearing of the cord 22. The ring 24 will preferably be of a size to allow passage of the strap 12 through the ring 24 without bending the strap 12.

The second end 30 of the cord 22 is passed through the body 82 of the hook assembly 28 in a first direction 29 as further explained below. The second end 30 of the cord 22 has a knot 81 formed therein after passing through the hook assembly 28 to prevent the cord 22 from traveling in a second, opposite, direction 31 back through, and out of, the hook assembly 28.

The hook assembly 28 is, preferably, made of cast aluminum or the like and generally comprises the body 82, the cam 84, and the cam follower 86. The hook assembly 28, in and of itself, is a known design and, per se, does not form a part of the invention, but will be briefly described for purposes of clarity and exposition.

The body 82 has a first end 88 defining a cylindrical channel (not shown) for admitting the cord 22 therethrough. A hollow central portion 90 of the body is defined by two parallel side walls, such as at 92. A second end 94 of the body is formed in a hook 96 capable of substantially surrounding the cord 22. The cam 84 and cam follower 86 are pivotally fitted within the hollow central portion 90 by a pin 98 passing through the side walls 92. The cam 84 is spring loaded (not shown) to a closed position. The cam has a knurled or toothed surface (not shown) for gripping the cord 22 and preventing its travel in the second direction 31 out of the body 82. The cam follower 86 has a surface (not shown) opposing the cam knurled surface within the body 82. The cam follower surface (not shown) and the cam knurled surface (not shown) define therebetween a variable width channel for unopposed cord passage in the first direction 29 and selective cord passage in the second direction 31, therethrough. A cam flange 102 affixed to the cam 84 is operable by finger pressure for channel width selection as further explained below. The cam follower 86 has a flange or armature 100 thereon placed so as to substantially close the mouth 103 of the hook 96 when the cam 84 is in its normally closed position.

In use, the strap 12 is passed through the ring 24. The strap 12 is then placed about the waist 16 or torso 17 of the wearer 18 and secured thereabout into the annular belt 19 in a comfortably snug fashion by passing the free end 13 of the strap 12 through the buckle central opening 48 and over the tensioning bar 60 and drawing the strap 12 through the buckle 14 to attain a proper fit.

As seen in FIGS. 1 and 2, the cord 22 is thereby attached at the first end thereof through the ring 24 to the strap 12. The cord 22 is then passed around the circumference of the tree 32 and fastened by the hook assembly 28 back onto the ring 24. Thus, the wearer 18 is secured to the tree 32 in such a fashion that the wearer 18 may ascend the tree 32 by the use of foot pegs, one of which is shown at reference no. 104. These foot pegs 104 are commonly mounted to the tree 32 in serial order by the wearer 18 as he ascends the tree 32, thus requiring the use of the hands 106 the wearer 18. The wearer 18 has therefore only to lean back against the safety harness 10 and the previously secured foot pegs 104 to allow his hands 106 the freedom to mount the pegs 104 or the tree stand 74, FIG. 2; while also being saved from a precipitous plunge from the tree 32 should a foot 108 slip from a peg 104.

Figure 4:
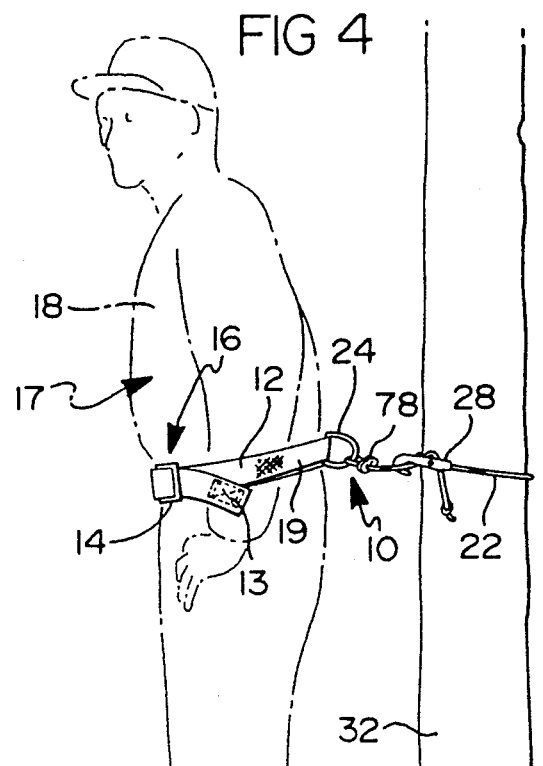
FIG. 4 is an environmental view of the safety harness in use with a tree stand.

As seen in FIG. 4, once the wearer 18 has attained his position on the tree stand 74 the hook assembly 28 may be detached from the ring 24 and refastened over the cord 22 to allow the safety harness 10 to act as a tether to the tree 32 allowing the wearer a range of movement while still securing the wearer 18 to the tree 32.

Should the strap 12 need loosening about the waist 16 the wearer 18 may tug on the ribbon 70 to move the buckle frame 40 relative to the tensioning bar 60 therein allowing the strap 22 to let out slack from the free end 13 thereof.

Should the cord 22 need tightening about the tree 32, the cord second end 30 may be pulled through the hook assembly 28 in the first direction 29 with no resistance from the cam 84. Conversely, the cam 84 will not allow loosening of the cord 22; i.e., movement in the second direction 31 through the hook assembly 28; unless pressure is applied to cam flange 102 to release the grip of the cam 84 on the cord 22, by opening the channel width between the cam 84 and cam follower 86.

Thus, the present invention provides a lightweight, durable, inexpensive, safety harness for a tree stand hunter which will greatly reduce the risk of injuries associated with climbing of trees and hunting from tree stands.

Having, thus, described the invention, what is claimed is:

1. A safety harness comprising:
   (a) a strap capable of encircling the torso of a wearer;
   (b) a buckle attached to the strap for releasably closing the strap into an annular belt;
   (c) a ring capable of slidably receiving the strap therethrough and encircling the strap;
   (d) a cord having first and second ends, the cord being affixed at the first end thereof to the ring; and
   (e) a hook assembly having:
      (1) means for permitting substantially unimpeded cord travel therethrough in a first direction, while selectively impeding the travel of the cord therethrough in a second direction,
      (2) a hook which is alternately engageable with either the cord or the ring, the hook having a mouth, and
      (3) an armature for selectively closing the mouth of the hook.

2. The harness of claim 1, wherein the strap is of a lightweight, stretch-resistant, material.

3. The harness of claim 1, wherein the cord is composed of a lightweight, stretch-resistant material.

4. The harness of claim 1, further comprising means for slackening the annular belt with a single hand.

5. The harness of claim 4, wherein the means for slackening further comprises a ribbon attached to the buckle.

6. The harness of claim 1, further comprising a crimped body for securing the cord to itself at the first cord end.

7. The harness of claim 1, wherein the buckle further comprises a rectangular frame having races formed therein and a tensioning bar slidably retained in the races.

8. The harness of claim 1, wherein the hook assembly further comprises:
   (a) a body having a first end, a second end, and a hollow central portion,
      (1) the first end defining a channel for admitting the cord therethrough;
      (2) the second end formed in a hook;
   (b) a cam follower located in the hollow central portion and pivotally affixed to the body, the cam follower having an armature thereon for closing the mouth of the hook,
   (c) a cam located in the hollow central portion and pivotally affixed to the body,
      (1) the cam having an armature thereon for manual control of the cam,
      (2) the cam having a knurled surface in opposition to the cam follower; and
   (d) a spring biasing the knurled cam surface to engagement with the cam follower.

* * * * *